April 15, 1952     H. E. BIANCHI     2,592,534
CONFECTION MAKING APPARATUS
Filed Sept. 21, 1945     2 SHEETS—SHEET 1
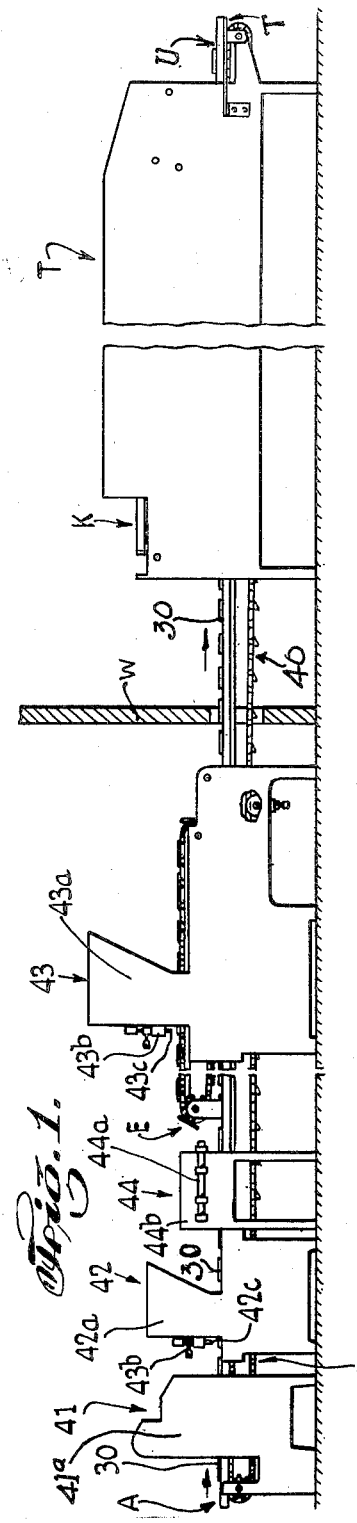
INVENTOR.
Henry E. Bianchi
BY
Louis Barnett
ATTORNEY

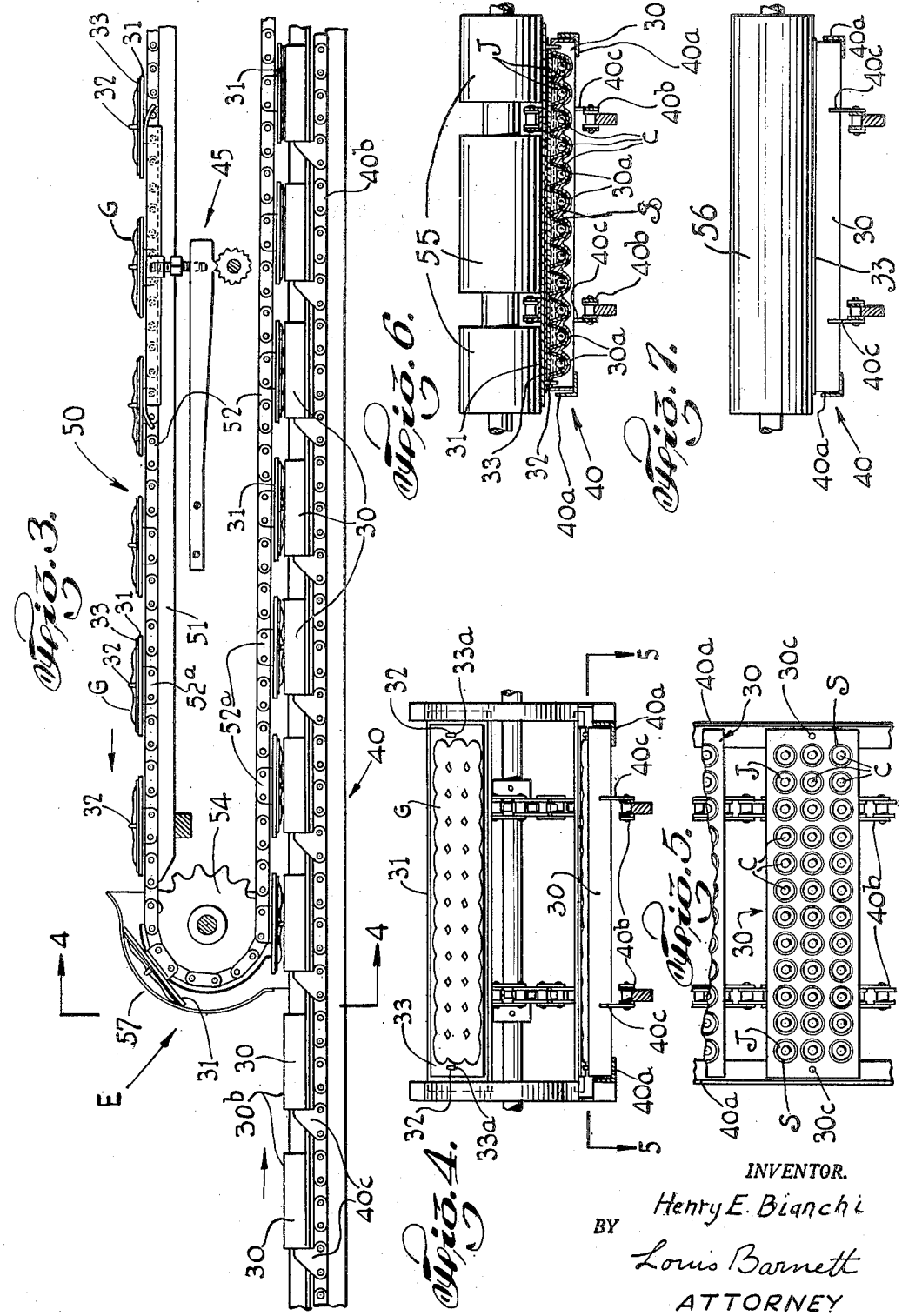

Patented Apr. 15, 1952

2,592,534

UNITED STATES PATENT OFFICE 2,592,534

CONFECTION MAKING APPARATUS

Henry E. Bianchi, Elmhurst, N. Y., assignor to G. Cella, Inc., New York, N. Y., a corporation of New York Application September 21, 1945, Serial No. 617,754

1 Claim. (Cl. 107—1)

This invention relates to an improved confection manufacturing apparatus, more particularly being directed to improvements for enrobing liquids, or preserved fruits in juices or syrups in chocolate shells.

Among the objects of the invention is to generally improve the confection manufacture whereby fewer and simpler apparatus parts are required, which shall operate with less labor for continuous operation, and which shall be practical and efficient to a high degree in use.

This invention may be adapted for incorporation in such apparatus as shown and described in applicant's United States Letters Patent No. 2,163,580, granted June 27, 1939, for reducing the labor requirements and for more efficient operation, and is a continuation in part of application Ser. No. 569,524, filed December 23, 1944, now Patent No. 2,487,417, issued November 8, 1949.

Other objects of the invention will in part be obvious and in part hereinafter pointed out.

The invention accordingly consists in the features of production, combinations of elements and arrangement of parts which will be exemplified in the construction hereinafter described and of which the scope of application will be indicated in the following claims.

In the accompanying drawing, in which is shown one possible illustrative embodiment of this invention:

Fig. 1 is a front elevational view of an apparatus constructed to incorporate the invention.

Figs. 2 and 3 are enlarged fragmentary elevational views, showing partly in section the forward and rearward portions, respectively, of the closure bottom chocolate layer applying mechanism.

Fig. 4 is an end view of the rearward portion of said layer applying mechanism as seen from line 4—4 in Fig. 3.

Fig. 5 is a detailed frgamentary view showing the multi-cavity mold in position on the conveyor before the closure bottom chocolate layer is applied, as seen from line 5—5 of Fig. 4, and Figs. 6 and 7 are detailed cross-sectional views taken on lines 6—6 and 7—7, respectively, in Fig. 2, Fig. 6 showing a cross-sectional view of the multiple-cavity mold in position on the conveyor after the closure bottom layer is applied.

Referring in detail in the drawing, the invention is shown installed in a complete confection apparatus, similar to that disclosed in my Patent No. 2,163,580, except as herein described with respect to the construction and incorporation of the improved mechanism for applying closure bottom chocolate layers G on filled shells S which are carried in multi-cavities 30a of molds 30, the latter preferably being made of metal in the form shown in Figs. 5 and 6 with 36 cells or cavities 30a in 3 rows or lines.

Said apparatus when incorporating the invention as shown in Fig. 1, includes a horizontally disposed elongated endless conveyor 40 having spaced stationary side bars or rails 40a, and spaced sprocket chains 40b movably mounted between said rails 40a. Chains 40b may be intermittently driven through motor or other suitable power means (not shown) in the well understood manner. Said conveyor 40 may have mounted thereon in spaced relation and cooperatively driven therewith, a fruit feeder 41 for supplying cherries or like pieces of fruit, a syrup or juice supplier 42, and a chocolate bud depositor 43, an oven heater 44 being provided between the juice supplier 42 and the chocolate bud depositor 43, as for example as shown in Fig. 1.

The fruit feeder 41 may be of any conventional make for feeding cherries C from a supply hopper 41a thereof to chocolate shells S in the cavities 30a of each mold 30 when the shells S are brought to register and in proper alignment with the feeder 41 as seen in Fig. 1.

The syrup or juice supplier 42 may be of any well understood construction capable of delivering measuring quantities of syrup or juices from a reservoir 42a thereof to aligned shells S in mold cavities 30a, thereunder, each shell then containing cherry C received from the fruit feeder 41 when positioned as shown in Fig. 1.

The chocolate bud depositor 43 may also be of any well known construction to the extent that drops or buds D of chocolate are deposited from a mixer-container 43a of said depositor 43 through a valve block 43b onto a sheet 33 supported on a plate 31, said block 43b having nozzles 43c located to correspond with the spacing of the shells S of each row or line in mold cavities 30a as shown in Figs. 1 and 2.

The oven heater 44 may be of any standard type as for example, having a gas burner 44 enclosed in a casing 44b which extends over a portion of the conveyor 40 so that the molds 30 after being filled but before the bottom chocolate layers G are applied to close the filled shells S, have the mold top side 30b subjected to the heat in passing through the oven heater 44 as is seen from Fig. 1.

The sheet 33 on plate 31 is shaped like the top surface of the cavity side of the mold 30 but is slightly longer and wider, said sheet 33 preferably being made of a material or surfaced to have the chocolate buds D when deposited, spread out thereon and solidified on forming bottom closures G, readily removable without adhering to provide a smoothly finished surface. Said sheet 33 may be made with suitable means, such as spaced edge border openings 33a to fit a corresponding set of pins 32 carried by the plates 31 for detachably retaining the sheet on the plate 31.

As one result of the invention the number of plates 31 required in the manufacturing operation has been greatly reduced and considerable labor has been saved due to the improved arrangement of automatically handling, that is, in turning the plates 31 carrying the sheets 33 and deposited chocolate layer G which operation heretofore was performed manually as described in my aforesaid patent. To this end there is provided a second endless conveyor 50, having spaced stationary side bars or rails 51, and spaced sprocket chains 52 movably mounted between said rails 51. The conveyor 50 extends part way the length of conveyor 40 and immediately thereover, the top length thereof passing under the chocolate depositor 43, as shown in Figs. 1 to 3. These chains 52 which pass over suitably positioned spaced sprocket wheels 53, may be intermittently driven by a suitable power transmission (not shown) through drive sprockets 54 in timed relation with the intermittent power drive of the conveyor 40 in the well understood manner.

Carried in uniform spaced relation by the conveyor chain 52 and secured to chain links 52a are a series of said plates 31 which in travelling with the conveyor chain 52 are successively presented to be positioned over the top or cavity side 30b of the mold 30, the latter being advanced by pusher-links 40c of the conveyor chains 40b as shown in Figs. 1 to 3.

The plates 31 used in conjunction with the moving molds 30 may be slightly larger than the top sides thereof, each plate 31 preferably being formed of slightly resilient sheet material. Although said plates 31 are carried with conveyor chain 51 by said links 52a, they are also sufficiently releasably mounted to register in alignment with the molds 30 on conveyor 40.

The purpose of this alignment is to positively position the bottom closure layers G on sheet 33 over the shells S carried in the cavities 30 of each mold 30. As here shown, the spaced pins 32 to which sheet 33 are attached may be made to upstand from each of the plates 31 and when in said alignment are fitted into spaced holes 30c which extend in from the top side 30b of the mold 30. See Figs. 4 to 6.

In practising the invention the drops or buds D are made of sufficient chocolate in quantity to provide the formation of bottom closures of the finished product, said formation being accomplished through a "forced spreading" by the use of a shaker or vibrating means denoted generally at 45, as shown in Fig. 3, and actuated in cooperation with the upper portion of the conveyor chains 52 which has passed the chocolate depositor 43.

The above described apparatus embodying the invention operates as follows:

After the cells or cavities 30a of molds 30 are coated with cup shaped chocolate shells S to provide the sides and tops of the confection product being made, by any well understood process, said cavity-chocolate coated molds 30 are placed between the L-shaped rails 40a of the conveyor 40 at the end thereof marked A as shown in Fig. 1, one at a time. The conveyor chains 40b moving intermittently in the direction indicated by the arrow, slidably carries the leading coated mold 30 under the fruit feeder 41. Upright pusher chain links 40c uniformly spaced along the chains 40b engage successive molds 30 carrying the latter along in the movement thereof. Said rails 40a and the pusher links 40c positively control the path of movement and spacing of successive molds 30. The drive of the chains 40b with the pusher links 40c being intermittent, there is a dwell or rest period in the progressive movement arranged to occur when the leading mold 30 reaches a position under the fruit feeder 41. At that time cherries C drop out into the shells S in the mold cavities 30a.

The conveyor 40 then continues to advance and when the leading mold 30 with the shells S and cherries C reach a position under the syrup supplier 42 there occurs another dwell and a measured quantity of syrup J from the reservoir 42a is allowed to pass through a valve block 42b and be distributed by spouts 42c to all the shells S concurrently. The quantity of syrup supplied to each shell S may be approximately three quarters the contents thereof so that after sealing said shells S the finished product will be short of being completely filled.

The conveyor as it continues to advance the molds 30 with the shells S each filled with a cherry C and syrup J pass through the oven heater 44. Each mold 30 and contents are heated to precondition the upper portions of the shells S for the step of sealing same, the heat absorbed by said mold and contents being sufficient to retain such conditioning until the application of the closure bottoms G, in the manner hereinafter described.

The construction and arrangement of the devices, namely, fruit feeder 41, juice supplier 42, chocolate depositor 43 and oven heater 44, with respect to the conveyor belts, are such, that as the dwells of the conveyor belts occur, simultaneous operation of each of said devices takes place. The application of heat for preconditioning the product in the molds 30 takes place just before the plates 31 with the sheets 33 and the "force spread" layers G are turned to face and are positioned over the filled shells S carried in the mold 30 on the conveyor 49.

As the chocolate depositor 43 drops buds D on the sheets 33 passing thereunder, said buds D are changed to the interconnecting circular-shaped wafer thin bottom closure G by forced spreading, the latter then being of sufficient size to cover shells S of each mold 30. The "forced spreading" of the buds D takes place while the buds D on the sheet 33 are in a plastic state and is accomplished through the operation of the vibrator 45 on the chain 52 and plate 31 in the same manner as described and shown for the installation in said Patent No. 2,163,579.

When each of the plates 31 carrying said bottom layer G passes beyond the vibrator 45, it reaches the end E of conveyor 50 and is turned from an upwardly facing position to face downwardly toward the cavity side 30b of the filled molds 30 being advanced by the conveyor 40 and for travelling in the same direction and in alignment therewith.

The speeds, dwelling period and spacings of the molds 30 on the conveyor 40 are relatively identical with those of the plates 31 being advanced by the conveyor 50. The chains 52, however, may be operated with a slight slack so that the lower portion thereof with the plates 31 sag a little permitting the pins 32 on turning of plate 31 to be eased into entering the holes 30c of the underlying mold 30 thereby positively aligning, that is, matching the bottom closure layer G on the sheet 33 to properly register with the filled open shells S in the mold 30, as is clearly shown in Fig. 3. Said lower portions of chains 52 are so positioned that the closure layer G is then slightly above the upper level of the mold 30 and as the layer G matching with said filled shells S are advanced in unison, the layer G is formed down into sealing position.

To assure that the plates 31 are positively brought into close covering position for forcing the layer G into said sealing position, a pressure roller 55 may be provided, and located inwardly from the forward end F of the conveyor 50, as shown in Figs. 2 and 6, to exert an additional downward pressure on the plates 31 before the latter leave their matching position at the conveyor end F.

Thus it is seen that the improved method of operation includes a first step of forcing down layer G by rolling pressure applied through roller 55, that is, by uniformly applying rolling pressure on successive portions of each slightly resilient plate 31 over the entire sheet 33, the latter then being interposed between the plate 31 and layer G as described above and shown in Figs. 2 and 6, and thereafter providing a second step, namely, roll pressing the applied layer G, with said plate 31 removed, that is, applying roller 56 directly against the flexible sheet 33 to permit flexing of successive portions of the applied layer G as described above and shown in Figs. 2 and 7 to complete and positively assure sealed closures for the filled shells S thereby making a more practical and efficient quantity production.

The conveyor 40 extends beyond conveyor end F and the filled molds with the bottom layers G covered now with only the flexible sheets 33 applied thereto, the plates 31 having been removed, continue to advance, and pass under a suitable pressure roller 56, as shown in Figs. 2 and 7. Here the flexible sheets 33 are flexed to permit successive portions of the bottom layers G to be pressed firmly into making a sure and positive sealed closure for said filled shells S.

The operations of the apparatus above described take place while the mold is still in preconditioned state and the bottom layer G sufficiently plastic to fuse with the shells S.

The conveyor 50 meanwhile has lifted the plate 31 and removed the same from the sheet 33, the pins 32 projecting from the plate being eased out of the mold holes 30c as the plates 31 are advanced to be again turned over when separated from the molds 30 after leaving the conveyor end F. Each plate 31 on being lifted off the mold 30 leaves the sheet 33 covering the closure layer G, as shown in Fig. 2. When however the plates 31 again face upwardly, that is, along a horizontally extending portion of conveyor 50, another sheet 33 may be placed in position with the holes 33a thereof fitted over the plate pins 32. As is seen from the drawing, the latter serve to retain the sheet 33 in place and permit the ready detachment thereof as described above after the plates 31 are lifted away from the molds 30. In order that the sheets 33 positively remain in position on the plates 31 while carrying the bottom layer G particularly when said plates 31 are being turned over at the conveyor end E, a suitable guard means, such as guide member 57, may be provided for retaining the edges of said sheets 33 and preventing the latter from accidentally leaving the plates 31, as shown in Fig. 3.

The molds 30 after leaving the roller 56 may have the flexible sheets 33 removed therefrom for inspection and for permitting the fixing up of any imperfections found in the closure layer G or the sealed joints formed thereby with the shells S, said removal of the sheets 33 being carried out after the molds 30 have been cooled sufficiently to permit the chocolate contents thereof to set or harden.

In quantity production, the installation such as shown in Fig. 1 has the conveyor 50 made long enough to allow time for the chocolate bottoms G and the sealed closure joints to set, that is, to become substantially solid, said conveyor being passed through a suitably constructed cooling tunnel device T. When each of the filled molds 30 with the sealed shells S reach the rear end of the conveyor 50, the sheets 33 are removed from the hardened bottom layer G for the inspection of the sealed closures as aforementioned, after which the uncovered molds may again be passed through the cooling tunnel device T from which they are unloaded at K and emptied of the completed finished products in the same manner as described in said United States Letters Patent No. 2,163,580.

It is thus seen that the invention when incorporated in apparatus such as described for making confections is greatly simplified in construction, requires less labor, and consequently is more efficient to meet the conditions of known practical use thereby achieving the several objects set forth.

As various other possible embodiments of the invention might be made use of, and as various changes in the embodiment above set forth, it is to be understood that all matters herein set forth or shown in the accompanying drawings and described in the specification is to be interpreted as illustrative and not in a limiting sense.

Havng thus described my invention, I claim as new, and desire to secure by Letters Patent:

A confection making apparatus of the character described comprising a multi-cavity mold having an open side adapted to carry filled shells therein, means for advancing said mold with the filled shells through the apparatus along one path, a flat resilient plate sized to conform to said open side serving as carrier for a shell closure layer, a flexible sheet removably interposed between said plate and layer on which said layer is deposited in a plastic state, means for advancing said plate with the sheet and deposited layer over said path in alignment with rim openings of said shells, a first rolling means applied against the plate to exert pressure through said sheet to said layer during said advancing movement for sealing said closure layer to rim portions of said filled shells while in fusing precondition, said last mentioned advancing means interconnecting with the resilient plate for movement therewith to dismount the latter after said closure layer sealing, and a second rolling means applied against said flexible sheet to exert pressure on said layer while still in a plastic state for positively assuring complete sealing of the filled shells closures while said rim portions thereof are still in fusing preconditioned state.

HENRY E. BIANCHI.

REFERENCES CITED

The following references are of record in the file of this patent:

UNITED STATES PATENTS

| Number | Name | Date |
|---|---|---|
| 1,790,361 | Winkler et al. | Jan. 27, 1931 |
| 1,894,077 | Winkler et al. | Jan. 10, 1933 |
| 2,163,580 | Bianchi | June 27, 1939 |
| 2,386,993 | Valdastri, Sr. | Oct. 16, 1945 |
| 2,487,417 | Bianchi | Nov. 8, 1949 |